United States Patent
Okuda et al.

(10) Patent No.: US 8,973,692 B1
(45) Date of Patent: Mar. 10, 2015

(54) WORK VEHICLE HAVING REDUCING AGENT TANK, BATTERY AND PARTITION PLATE POSITIONED BETWEEN TANK AND BATTERY

(71) Applicant: Komatsu Ltd., Tokyo (JP)

(72) Inventors: Kozo Okuda, Hirakata (JP); Naoto Nakamura, Hirakata (JP); Kiichirou Kouno, Hirakata (JP); Kenji Ohiwa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/235,173

(22) PCT Filed: Sep. 27, 2013

(86) PCT No.: PCT/JP2013/076301
§ 371 (c)(1),
(2) Date: Jan. 27, 2014

(51) Int. Cl.
*B60R 16/04* (2006.01)
*E02F 9/08* (2006.01)

(52) U.S. Cl.
CPC ............. *E02F 9/0883* (2013.01); *E02F 9/0866* (2013.01)
USPC .......................................................... 180/68.5

(58) Field of Classification Search
USPC ........... 180/309, 68.5, 89.1, 311; 296/187.03, 296/187.08, 187.11, 193.07, 193.08, 296/203.04; 280/834
See application file for complete search history.

(56) References Cited

U.S. PATENT DOCUMENTS 4,616,872 A * 10/1986 Akira et al. .............. 296/190.11
4,830,134 A * 5/1989 Hashimoto ................... 180/219
4,930,811 A * 6/1990 Tsukada et al. ............... 280/834
5,380,042 A * 1/1995 Hively et al. ................. 280/834
5,405,167 A * 4/1995 Lee .............................. 280/830
6,550,811 B1 * 4/2003 Bennett et al. ................ 280/833
7,017,336 B2 * 3/2006 Stiermann ...................... 60/286
7,108,091 B2 * 9/2006 Guidry et al. ................ 180/68.1
7,219,758 B2 * 5/2007 Guidry et al. .............. 180/65.31

(Continued)

FOREIGN PATENT DOCUMENTS

DE  10 2004 005 153 A1  8/2005
JP     2005-54788 A      3/2005

(Continued)

OTHER PUBLICATIONS

The International Search Report for the corresponding international application No. PCT/JP2013/076301, issued on Dec. 17, 2013.

(Continued)

*Primary Examiner* — Brodie Follman
(74) *Attorney, Agent, or Firm* — Global IP Counselors, LLP (57) ABSTRACT

A work vehicle includes a reducing agent tank, a battery, a reducing agent tank mounting member, a battery cover and a first guide member. The battery and the tank are positioned in a row. The mounting member has a bottom plate, and a partition plate extending upward from the bottom plate between the tank and the battery. The tank is mounted on the bottom plate. The battery cover has an upper plate above the battery, and a side plate extending downward from a side of the upper plate between the tank and the battery. The first guide member extends from the side plate toward the tank and slopes downward. Preferably, a first end of a second guide member disposed below the first guide member is positioned closer to the battery than a distal end of the first guide member, with the second guide member sloping downward toward the tank.

11 Claims, 10 Drawing Sheets

(56) References Cited

U.S. PATENT DOCUMENTS

| | | | |
|---|---|---|---|
| 7,374,208 B2* | 5/2008 | Yamamoto et al. | 280/834 |
| 7,377,253 B2* | 5/2008 | Washeleski et al. | 123/198 D |
| 8,453,778 B2* | 6/2013 | Bannier et al. | 180/68.5 |
| 8,505,662 B2* | 8/2013 | Schwarz et al. | 180/68.5 |
| 8,794,365 B2* | 8/2014 | Matsuzawa et al. | 180/68.5 |
| 8,820,455 B2* | 9/2014 | Nitawaki et al. | 180/68.5 |
| 2002/0185320 A1* | 12/2002 | Murase | 180/68.5 |
| 2003/0047366 A1* | 3/2003 | Andrew et al. | 180/68.5 |
| 2004/0108150 A1* | 6/2004 | Guidry et al. | 180/65.3 |
| 2004/0108151 A1* | 6/2004 | Guidry et al. | 180/65.3 |
| 2004/0181977 A1* | 9/2004 | Yamamoto et al. | 37/347 |
| 2005/0022515 A1* | 2/2005 | Stiermann | 60/286 |
| 2010/0000816 A1* | 1/2010 | Okada | 180/68.5 |
| 2010/0294577 A1* | 11/2010 | Shimomura et al. | 180/65.1 |
| 2011/0000729 A1* | 1/2011 | Schwarz et al. | 180/68.5 |
| 2013/0071212 A1* | 3/2013 | Yunoue et al. | 414/685 |
| 2013/0248267 A1* | 9/2013 | Nitawaki | 180/68.5 |
| 2013/0299255 A1* | 11/2013 | Matsumura et al. | 180/65.1 |
| 2013/0313030 A1* | 11/2013 | Matsumura et al. | 180/65.1 |
| 2013/0319779 A1* | 12/2013 | Nitawaki et al. | 180/68.5 |
| 2013/0319780 A1* | 12/2013 | Nitawaki | 180/68.5 |
| 2013/0327583 A1* | 12/2013 | Nitawaki et al. | 180/68.5 |

FOREIGN PATENT DOCUMENTS

| | | |
|---|---|---|
| JP | 2005-307968 A | 11/2005 |
| JP | 2009-221884 A | 10/2009 |
| JP | 2012-144955 A | 8/2012 |
| JP | 2012-237232 A | 12/2012 |

OTHER PUBLICATIONS

The Office Action for the corresponding German application No. 11 2013 000 147.0, issued on Jul. 29, 2014.

* cited by examiner

WORK VEHICLE HAVING REDUCING AGENT TANK, BATTERY AND PARTITION PLATE POSITIONED BETWEEN TANK AND BATTERY

CROSS-REFERENCE TO RELATED APPLICATIONS

This application is a U.S. National stage application of International Application No. PCT/JP2013/076301, filed on Sep. 27, 2013.

BACKGROUND

1. Field of the Invention

The present invention relates to a work vehicle.

2. Background Information

A work vehicle equipped with a selective catalyst reduction device for treating exhaust gas from an engine has been proposed. A hydraulic excavator described in Japanese Patent Laid-open No. 2012-237232, for example, includes a selective catalyst reduction device and a reducing agent tank. The selective catalyst reduction device uses a reducing agent such as urea water to treat the exhaust gas. The reducing agent is stored in the reducing agent tank.

SUMMARY

The reducing agent tank is disposed close to a battery and the battery is covered by a battery cover. When replenishing the reducing agent in the reducing agent tank, an operator may perform the replenishing in a state in which a container for storing the reducing agent for replenishing is placed on the battery cover. If the reducing agent spills while replenishing the reducing agent tank with the reducing agent from the container for replenishing, a problem arises in that the spilled reducing agent flows along the battery cover toward the battery and the reducing agent may adhere to the battery.

An object of the present invention is to prevent the adherence of reducing agent on the battery.

A work vehicle according to a first aspect of the present invention is equipped with a reducing agent tank, a battery, a reducing agent tank mounting member, a battery cover, a first guide member, and a second guide member. The battery is disposed in a row with the reducing agent tank with a gap therebetween. The reducing agent tank mounting member has a bottom plate and a partition plate. The reducing agent tank is mounted on the bottom plate. The partition plate extends upward from the bottom plate and is positioned between the reducing agent tank and the battery. The battery cover has an upper plate and a side plate. The upper plate is positioned above the battery. The side plate extends downward from a side of the upper plate and is positioned between the reducing agent tank and the battery. The first guide member extends from the side plate toward the reducing agent tank. The first guide member slopes downward toward the reducing agent tank. The second guide member is disposed below the first guide member and slopes downward toward the reducing agent tank. A first end of the second guide member is positioned closer to the battery than a distal end of the first guide member.

When replenishing the reducing agent tank with the reducing agent on the upper plate of the battery cover, it is easy to spill the reducing agent on a portion close to the reducing agent tank on the upper plate of the battery cover. As a result, when the reducing agent is spilled on the upper plate of the battery cover, the spilled reducing agent flows down from the upper plate along the side plate. The first guide member extends from the side plate toward the reducing agent tank and the second guide member is disposed below the first guide member. Moreover, the first guide member and the second guide member both slope downward toward the reducing agent tank. As a result, the reducing agent flowing downward along the side plate flows along the first guide member and drips down from the distal end (end closer to the reducing agent tank) of the first guide member toward the second guide member and then flows toward the reducing agent tank. In this way, the adherence of the reducing agent on the battery can be prevented since the reducing agent does not flow toward the battery.

Preferably, a second end of the second guide member is positioned closer to the reducing agent tank than the partition plate. According to this configuration, the reducing agent that drips down from the second end of the second guide member drips down to the reducing agent tank mounting member and does not flow toward the battery. As a result, the adherence of the reducing agent on the battery can be prevented.

The work vehicle preferably is equipped with a partitioning member that extends between the second guide member and the partition plate. According to this configuration, splashing toward the battery of the reducing agent that drips down onto the reducing agent tank mounting member can be prevented by the partitioning member.

Preferably, the partitioning member hangs down from the second guide member. Preferably, a lower end of the partitioning member is positioned closer to the reducing agent tank than the partition plate and is positioned lower than an upper end of the partition plate. According to the partitioning member configured in this way, splashing toward the battery of the reducing agent that drips down onto the reducing agent tank mounting member can be prevented more reliably.

Preferably, the partitioning member is made of rubber. According to this configuration, there is no concern that the partitioning member might become distorted and, moreover, the weight of the partitioning member can be reduced.

A work vehicle according to a second aspect of the present invention is equipped with a reducing agent tank, a battery, a reducing agent tank mounting member, a battery cover, and a first guide member. The battery is disposed in a row with the reducing agent tank with a gap therebetween. The reducing agent tank mounting member has a bottom plate and a partition plate. The reducing agent tank is mounted on the bottom plate. The partition plate extends upward from the bottom plate and is positioned between the reducing agent tank and the battery. The battery cover has an upper plate and a side plate. The upper plate is positioned above the battery. The side plate extends downward from a side of the upper plate and is positioned between the reducing agent tank and the battery. The first guide member extends from the side plate toward the reducing agent tank. The first guide member slopes downward toward the reducing agent tank. A distal end of the first guide member is positioned closer to the reducing agent tank than the partition plate.

According to this configuration, reducing agent spilled on the battery cover flows downward along the side plate, flows along the first guide member and drips down from the distal end of the first guide member. The distal end of the first guide member is positioned closer to the reducing agent tank than the partition plate. As a result, the reducing agent that drips down from the distal end of the first guide member drips down to the reducing agent tank mounting member and does not flow toward the battery. As a result, the adherence of the reducing agent on the battery can be prevented.

According to the present invention, adherence of reducing agent on the battery can be prevented.

DETAILED DESCRIPTION OF EMBODIMENT(S)

Figure 1:
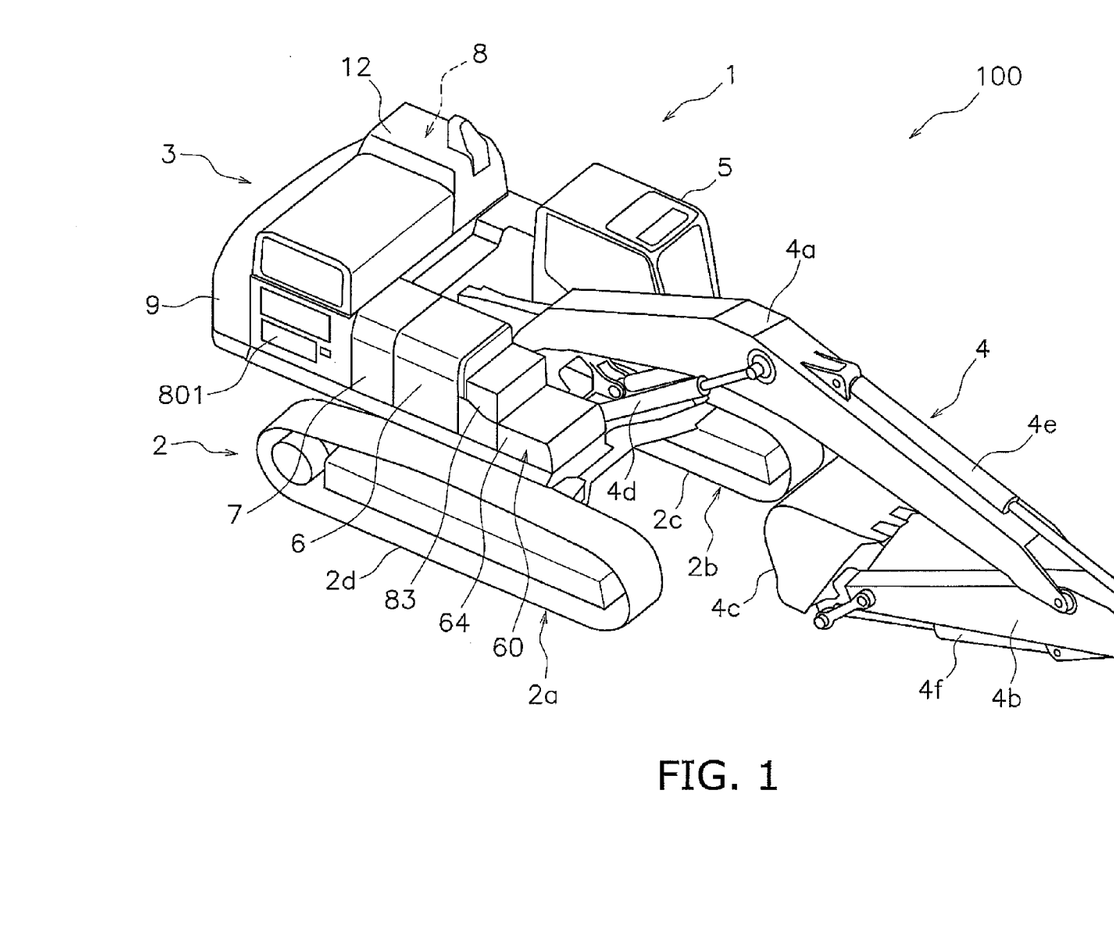
FIG. 1 is a perspective view of a hydraulic excavator.

A hydraulic excavator 100 according to an embodiment of the present invention shall be explained in detail with reference to the figures. FIG. 1 is a perspective view of the hydraulic excavator 100. In the following explanation, "front" and "rear" refer to the front and the rear of a vehicle body 1. In the following description, "right," "left," "up," and "down" indicate directions relative to a state of looking forward from the driver's seat, and "vehicle width direction" and "left-right direction" have the same meaning.

As illustrated in FIG. 1, the hydraulic excavator (example of a work vehicle) 100 includes the vehicle body 1 and work implement 4, and the work implement 4 is used for performing desired work.

The vehicle body 1 has an undercarriage 2 and a revolving body 3. The undercarriage 2 includes a pair of travel devices 2a, 2b. The travel device 2a has a crawler belt 2d and the travel device 2b has a crawler belt 2c. The travel devices 2a, 2b allow the hydraulic excavator 100 to travel due to the crawler belts 2c, 2d being driven by driving power from an engine 10.

The revolving body 3 is mounted on the undercarriage 2, and is provided in a manner that allows revolving in relation to the undercarriage 2. The revolving body 3 has an operating cabin 5, a fuel tank 6, an operating fluid tank 7, an engine room 8, and a counterweight 9.

The fuel tank 6 stores fuel for driving the engine 10 and is disposed in front of the operating fluid tank 7. The operating fluid tank 7 stores operating fluid. The operating fluid tank 7 is arranged in a line in the front-back direction with the fuel tank 6.

The engine room 8 houses equipment such as the engine 10, a hydraulic pump 11, an exhaust gas post-processing unit 20 and the like as described below. The engine room 8 is disposed to the rear of the operating cabin 5, the fuel tank 6, and the operating fluid tank 7. An engine hood 12 is disposed above the engine room 8. The counterweight 9 is disposed to the rear of the engine room 8.

The work implement 4 is attached at the front of the revolving body 3. The work implement 4 includes a boom 4a, an arm 4b, a bucket 4c, a pair of boom cylinders 4d, an arm cylinder 4e, and a bucket cylinder 4f. The proximal end of the boom 4a is coupled to the revolving body 3 in a rotatable manner. The proximal end of the arm 4b is coupled in a rotatable manner to the distal end of the boom 4a. The bucket 4c is coupled in a rotatable manner to the distal end of the arm 4b. The boom cylinders 4d, the arm cylinder 4e, and the bucket cylinder 4f are hydraulic cylinders and are driven by operating fluid discharged from the belowmentioned hydraulic pump 11. The boom cylinders 4d actuate the boom 4a. The arm cylinder 4e actuates the arm 4b. The bucket cylinder 4f actuates the bucket 4c. The driving of the cylinders 4d, 4e, and 4f drives the work implement 4.

Figure 2:
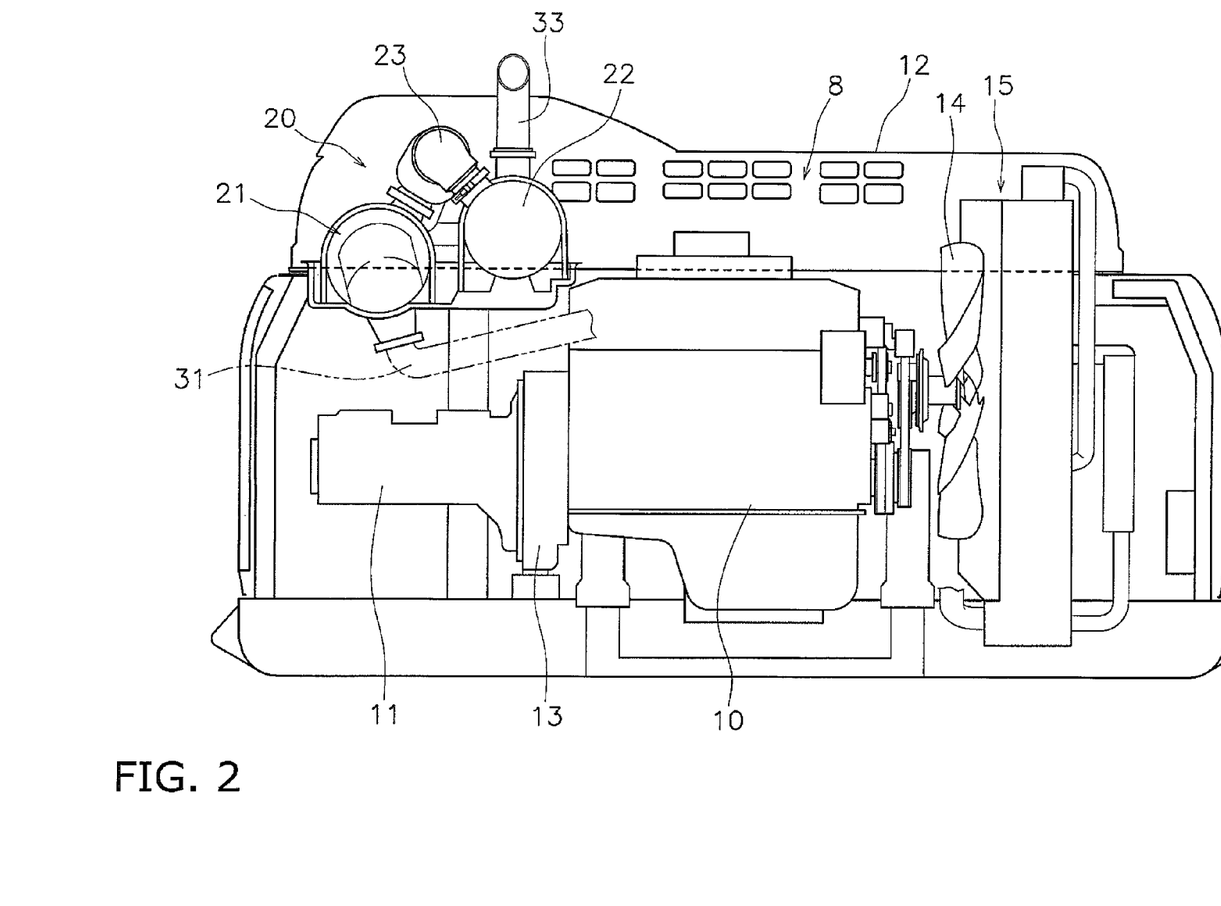
FIG. 2 is a back view an internal structure of an engine room.

FIG. 2 illustrates the internal structure of the engine room 8 as seen from the rear of the vehicle. As illustrated in FIG. 2, the engine 10, a flywheel housing 13, the hydraulic pump 11, the exhaust gas post-processing unit 20, a fan 14, and a radiator 15 are disposed in the engine room 8. The fan 14 produces an air current to be blown from the right to the left inside the engine room 8. The radiator 15 is installed on the right side of the fan 14. Cooling air is introduced into the engine room 8 from outside through air vent holes 801 (see FIG. 1) when the fan 14 is operating. The cooling water flowing inside the radiator 15 is cooled by the cooling air. The engine 10, the flywheel housing 13, and the hydraulic pump 11 are disposed in order in a row in the vehicle width direction.

The hydraulic pump 11 is driven by the engine 10. The hydraulic pump 11 is disposed on the left side of the engine 10. The flywheel housing 13 is disposed between the engine 10 and the hydraulic pump 11. The flywheel housing 13 is attached to the left side surface the engine 10. The hydraulic pump 11 is attached to the left side surface the flywheel housing 13.

Figure 3:
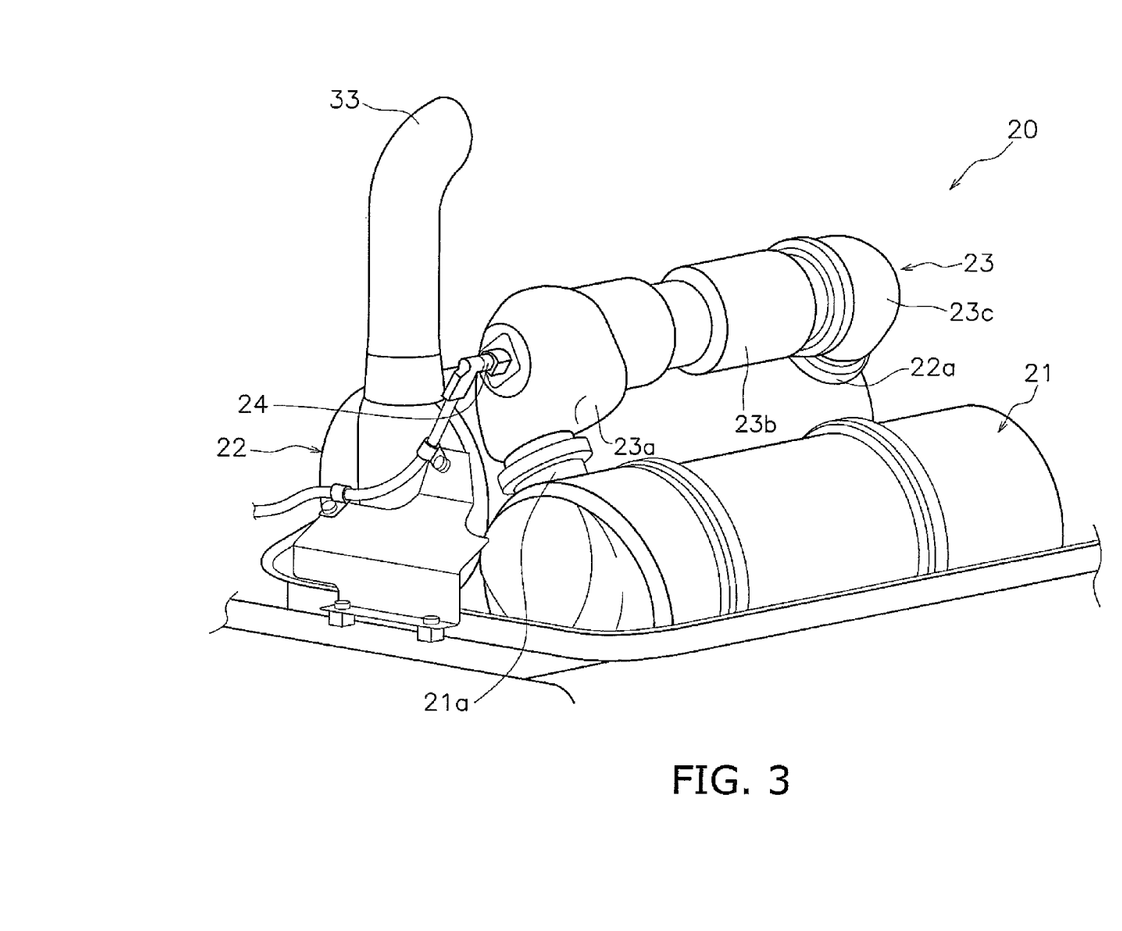
FIG. 3 is a perspective view of the exhaust gas post-processing unit.

FIG. 3 is a perspective view of the exhaust gas post-processing unit 20 as seen from the right front. As illustrated in FIGS. 2 and 3, the exhaust gas post-processing unit 20 treats exhaust from the engine 10. The exhaust gas post-processing unit 20 has a diesel particulate filtering device (DPF) 21, a selective catalyst reduction device (SCR) 22, a connecting pipe 23, and an injection device 24.

The diesel particulate filtering device 21 is a device for treating exhaust from the engine 10. Exhaust gas is supplied from the engine 10 via a turbo charger (not shown) and a pipe 31 to the diesel particulate filtering device 21. Specifically, the diesel particulate filtering device 21 is a device that collects, in a filter, particulate matter included in the exhaust gas. The diesel particulate filtering device 21 burns the collected particulate matter with a heater provided with the filter. The diesel particulate filtering device 21 has a roughly cylindrical shape and is disposed so that the longitudinal direction thereof extends in the front-back direction.

The connecting pipe 23 is a pipe for connecting the diesel particulate filtering device 21 and the selective catalyst reduction device 22, and is disposed above the engine 10. The entire connecting pipe 23 is formed in an S-shape and includes a first bend section 23a, a linear section 23b, and a second bend section 23c. One end of the first bend section 23a is connected to an exhaust gas outlet 21a of the diesel particulate filtering device 21 and the other end of the first bend section 23a is connected to one end of the linear section 23b. One end of the second bend section 23c is connected to an exhaust gas inlet 22a of the selective catalyst reduction device 22, and the other end of the second bend section 23c is connected to the other end of the linear section 23b. The linear section 23b extends in the longitudinal direction of the connecting pipe 23 between the first bend section 23a and the second bend section 23c.

The injection device 24 is attached to the first bend section 23a. The injection device 24 is a device for injecting a reducing agent sucked up from a belowmentioned reducing agent tank 18 by a reducing agent pump 19, into the connecting pipe 23 in order to add the reducing agent to the exhaust gas flowing through the connecting pipe 23. The reducing agent in the present embodiment is urea water. The urea water mixed in the exhaust gas is hydrolyzed due to the heat of the exhaust gas to become ammonia, and the ammonia is fed with the exhaust gas through the connecting pipe 23 to the selective catalyst reduction device 22.

The selective catalyst reduction device 22 is a device for treating the exhaust gas from the engine 10. Specifically, the selective catalyst reduction device 22 reduces nitrogen oxide compounds with the ammonia obtained by the hydrolyzation of the urea. The selective catalyst reduction device 22 has a roughly cylindrical shape and is disposed so that the longitudinal direction thereof extends in the vehicle front-back direction. An exhaust pipe 33 is connected to the selective catalyst reduction device 22 and the exhaust pipe 33 projects upward from an engine hood 12. Exhaust gas treated by the exhaust gas post-processing unit 20 is discharged to the outside from the exhaust pipe 33.

The diesel particulate filtering device 21, the selective catalyst reduction device 22, the connecting pipe 23, and the injection device 24 are positioned above the engine 10. The diesel particulate filtering device 21, the connecting pipe 23, and the selective catalyst reduction device 22 are disposed parallel to each other. The diesel particulate filtering device 21 and the selective catalyst reduction device 22 are disposed close to each other and the longitudinal directions thereof are disposed in a row orthogonal to the vehicle width direction. The engine 10, the selective catalyst reduction device 22, the connecting pipe 23, and the diesel particulate filtering device 21 are disposed in order from the vehicle width direction right side.

Figure 4:
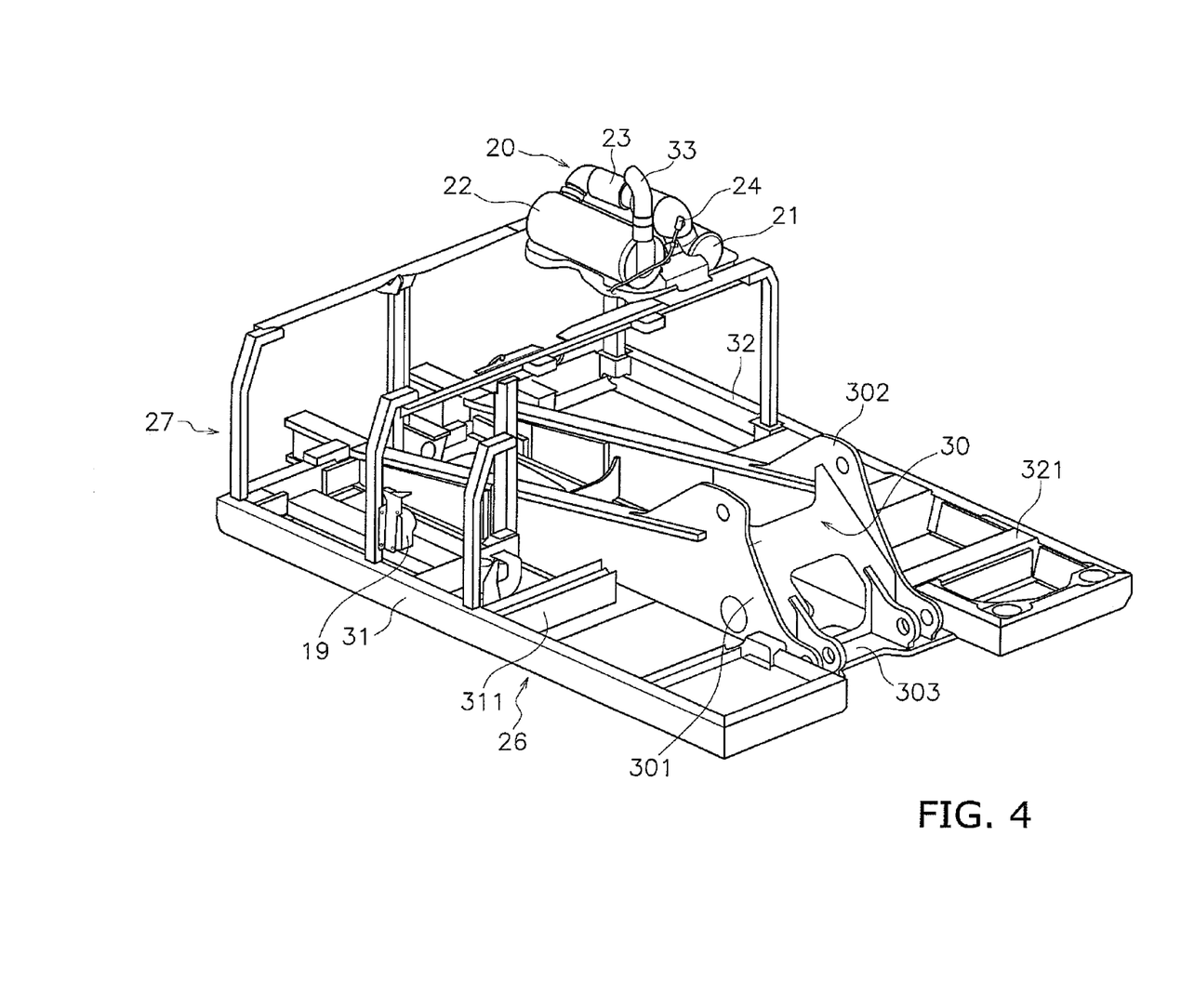
FIG. 4 is a perspective view of a frame structure of the hydraulic excavator.

FIG. 4 is a perspective view of a frame structure of the hydraulic excavator 10 seen from the right front. As illustrated in FIG. 4, the hydraulic excavator 100 includes a revolving frame 26 and a vehicle body frame 27.

The revolving frame 26 supports the engine 10 through a mounting member such as a rubber damper. The revolving frame 26 has a center frame 30, a first side frame 31, and a second side frame 32. The center frame 30 extends in the front-back direction of the vehicle. The engine 10 is disposed on a rear part of the center frame 30. The center frame 30 has a first center frame 301 and a second center frame 302. The first center frame 301 and the second center frame 302 are disposed away from each other in the vehicle width direction. The first center frame 301 and the second center frame 302 are plate-like members that respectively extend in the vehicle front-back direction and in the vertical direction. The center frame 30 has a bottom plate 303. The first center frame 301 and the second center frame 302 are coupled together by the bottom plate 303.

The first side frame 31 is disposed on one side in the vehicle width direction relative to the center frame 30. The second side frame 32 is disposed on the other side in the vehicle width direction relative to the center frame 30. In the present embodiment, the first side frame 31 is disposed to the right of the center frame 30. The second side frame 32 is disposed to the left of the center frame 30.

The first side frame 31 has a shape that extends in the front-back direction of the vehicle. The first side frame 31 is disposed away from the center frame 30 in the vehicle width direction. The first side frame 31 and the center frame 30 are coupled together by a plurality of beam members 311. Only a portion of the beam members are given the reference numeral 311 in the drawings.

The second side frame 32 has a shape that extends in the front-back direction of the vehicle. The second side frame 32 is disposed away from the center frame 30 in the vehicle width direction. The second side frame 32 and the center frame 30 are coupled together by a plurality of beam members 321. Only a portion of the beam members are given the reference numeral 321 in the drawings.

The vehicle body frame 27 is provided on the revolving frame 26 in a standing manner. The vehicle body frame 27 is disposed around equipment such as the engine 10 and the hydraulic pump 11 and the like. The abovementioned exhaust processing device 24 is attached to the vehicle body frame 27.

Figure 5:
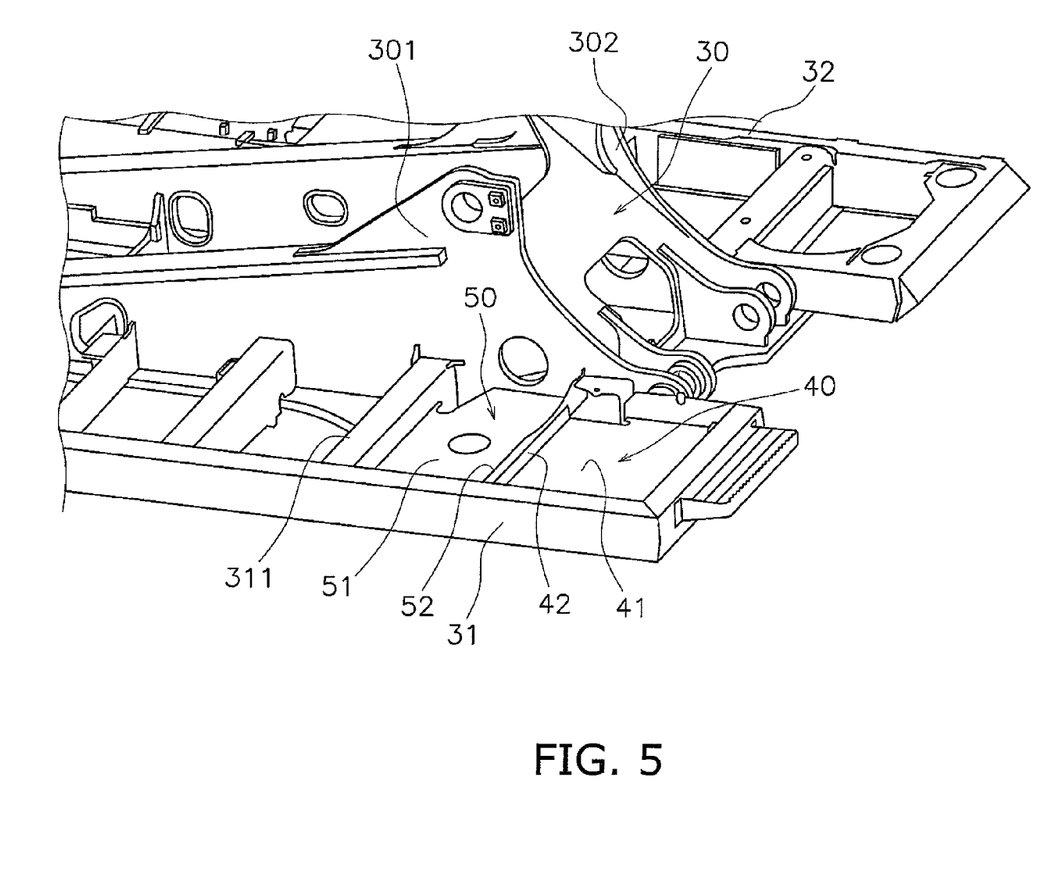
FIG. 5 is a partial perspective view of a detail of the frame structure of the hydraulic excavator.

FIG. 5 is a partial perspective view of a detail of the frame structure of the hydraulic excavator 100 as seen from the right front. As illustrated in FIG. 5, a battery mounting member 40 is installed in a right front part of the revolving frame 26. The battery mounting member 40 is a member for mounting a battery 17 (see FIG. 6). Specifically, the battery mounting member 40 has a bottom plate 41 and a rear plate 42.

The bottom plate 41 has a rectangular shape and the right edge thereof is fixed to the first side frame 31 by welding and the like. The battery 17 (see FIG. 6) is fixed onto the bottom plate 41 by mounting brackets and the like. The rear plate 42 extends upward from the rear edge of the bottom plate 41. The right edge of the rear plate 42 is fixed to the first side frame 31 by welding and the like.

A reducing agent tank mounting member 50 is installed to the rear of the battery mounting member 40 and adjacent to the battery mounting member 40. The reducing agent tank mounting member 50 is a member for mounting the reducing agent tank 18 (see FIG. 6). The reducing agent tank mounting member 50 has a bottom plate 51 and a partition plate 52.

The bottom plate 51 of the reducing agent tank mounting member 50 has a rectangular shape and has an opening near the center. The left edge of the bottom plate 51 is fixed to the center frame 30 by welding and the like, and the right edge of the bottom plate 51 is fixed to the first side frame 31 by welding and the like. The reducing agent tank is fixed onto the bottom plate 51 by mounting brackets and the like.

The partition plate 52 of the reducing agent tank mounting member 50 is positioned between the reducing agent tank 18 and the battery 17. Specifically, the partition plate 52 extends upward from the front edge of the bottom plate 51. The partition plate 52 is a plate-like portion that extends in the vertical direction and extends in the vehicle width direction. The left edge of the partition plate 52 is fixed to the center frame 30 by welding and the like, and the right edge of the partition plate 52 is fixed to the first side frame 31 by welding and the like. The front surface of the partition plate 52 abuts the rear surface of the rear plate 42 of the battery mounting member 40. The partition plate 52 extends upward further than the rear plate 42.

Figure 6:
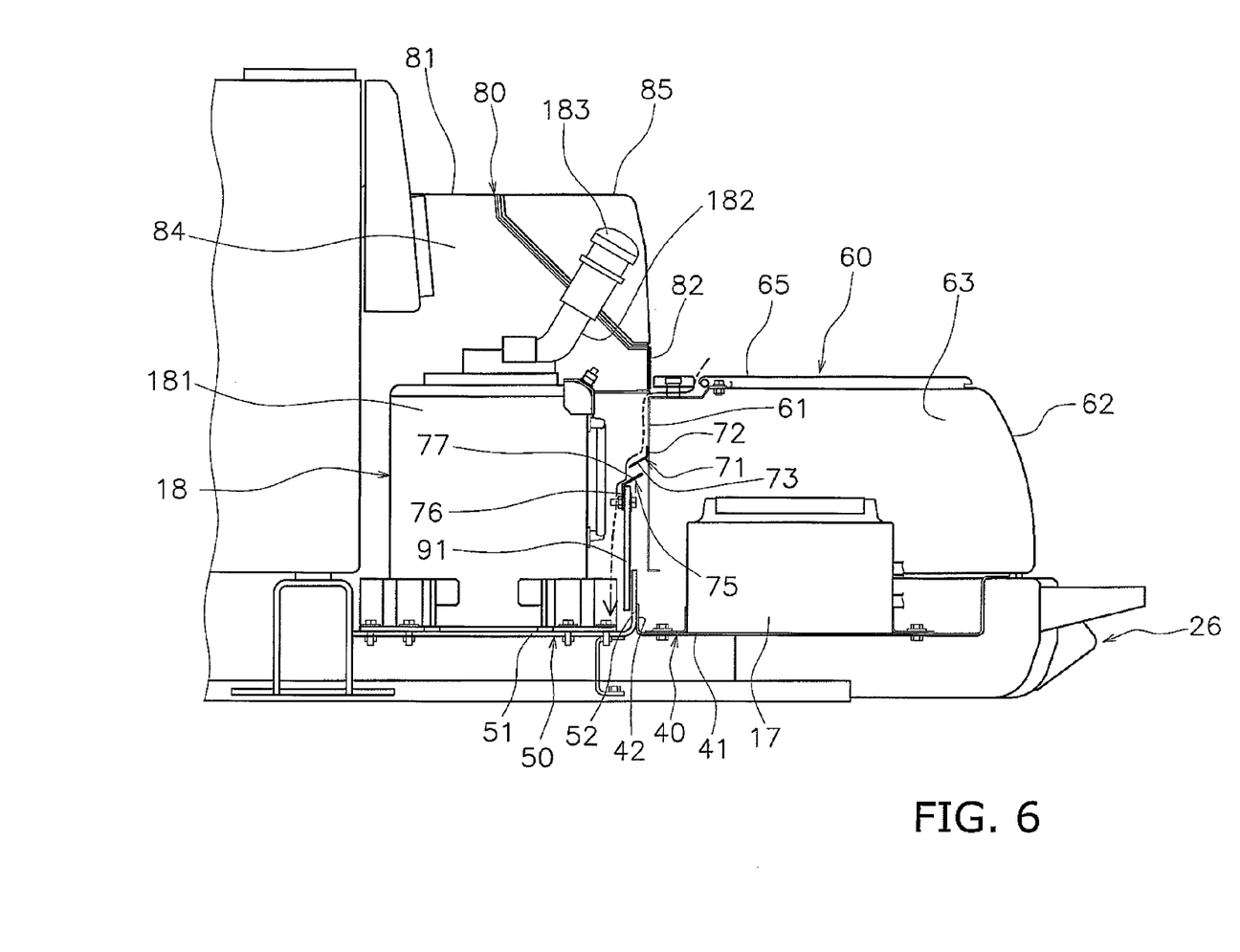
FIG. 6 is a side cross-sectional view of a right front part of a vehicle body.

FIG. 6 is a side cross-sectional view of a right front part of the vehicle body 1. As illustrated in FIG. 6, a battery cover 60 is fixed in a removable manner to the revolving frame 26 to cover the battery 17 that is fixed to the battery mounting member 40. The battery cover 60 is substantially formed in a rectangular solid shape and is open at the bottom surface. Specifically, the battery cover 60 has an upper plate 65 and first to fourth side plates 61 to 64.

The upper plate 65 has a rectangular shape and is positioned above the battery 17. The side plates 61 to 64 extend downward from the edges of the upper plate 65. The first side plate 61 extends downward from the rear edge of the upper plate 65 and is positioned between the reducing agent tank 18 and the battery 17. Specifically, the first side plate 61 is positioned to the rear of the battery 17. The first side plate 61 corresponds to the side plate of the present invention.

The second side plate 62 extends downward from the front edge of the upper plate 65, the third side plate 63 extends downward from the left edge of the upper plate 65, and the fourth side plate 64 extends downward from the right edge of the upper plate 65. The second to fourth side plates 62 to 64 are attached in a removable manner directly or indirectly to the revolving frame 27 whereby the battery cover 60 is attached to the revolving frame 27 in a removable manner.

The first side plate 61 is not attached to the revolving frame 27. Specifically, a lower end part of the first side plate 61 is positioned above the battery mounting member 40 without touching the battery mounting member 40. That is, a gap is formed between the lower end of the first side plate 61 and the battery mounting member 40. The first side plate 61 is positioned further forward than the rear plate 42 of the battery mounting member 40. Specifically, the first side plate 61 is positioned between the battery 17 and the rear plate 42 in the front-back direction.

Figure 7:
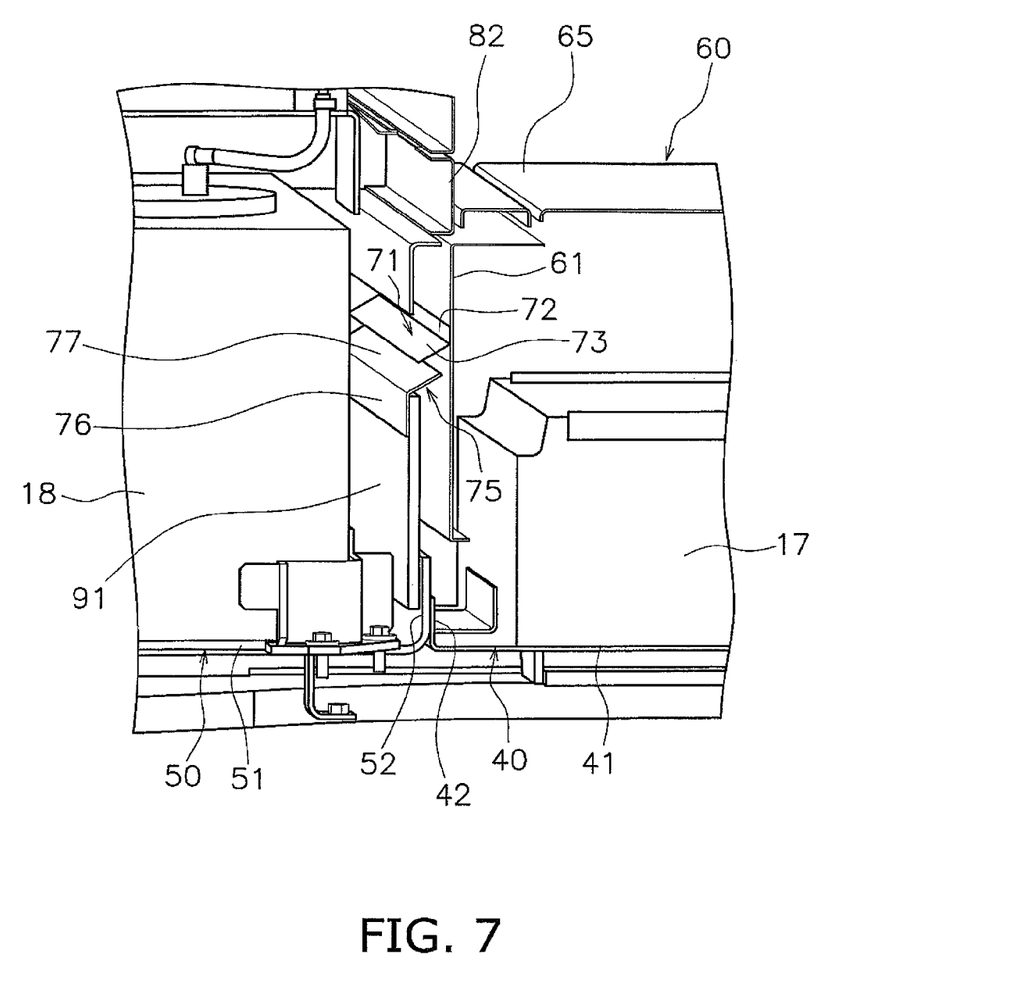
FIG. 7 is a perspective view of a detail close to a battery and a reducing agent tank.

FIG. 7 is a perspective view of a detail around the battery 17 and the reducing agent tank 18. As illustrated in FIGS. 6 and 7, a first guide member 71 is attached to the first side plate 61. The first guide member 71 extends from the first side plate 61 toward the reducing agent tank 18 and is sloped downward. The first guide member 71 extends in the vehicle width direction and has approximately the same length as the first side plate 61 in the vehicle width direction. The first guide member 71 is formed by bending one plate-like member (i.e., a steel plate), and has an attachment part 72 and a sloping part 73. The attachment part 72 is a portion fixed to the first side plate 61 and is fixed to the first side plate 61 by welding and the like. The sloping part 73 extends from the lower edge of the attachment part 72 toward the reducing agent tank 18. Moreover, the sloping part 73 slopes downward toward the reducing agent tank 18. A distal end 731 (see FIG. 9) that is the edge closest to the reducing agent tank 18 of the sloping part 73 is positioned directly above the partition plate 52 or closer to the reducing agent tank 18 than the partition plate 52.

The reducing agent tank 18 for storing the reducing agent is installed on the reducing agent tank mounting member 50. The reducing agent tank 18 has a tank body 181 and a replenishing part 182. The tank body 181 has a substantially rectangular solid shape and stores the reducing agent therein. The tank body 181 is connected to the reducing agent pump 19 via a reducing agent pipe (not shown), and the reducing agent pump 19 is connected to the injection device 24 via another reducing agent pipe (not shown).

The replenishing part 182 extends upward and toward the battery 17 from an upper part of the tank body 181. The replenishing part 182 has a tubular shape and has a lid part 183 at the distal end thereof. When replenishing reducing agent into the tank body 181, the lid part 183 is removed and the reducing agent is poured into the tank body 181 via the replenishing part 182. The upper end of the replenishing part 182 is positioned higher than the upper plate 65 of the battery cover 60.

Figure 8:
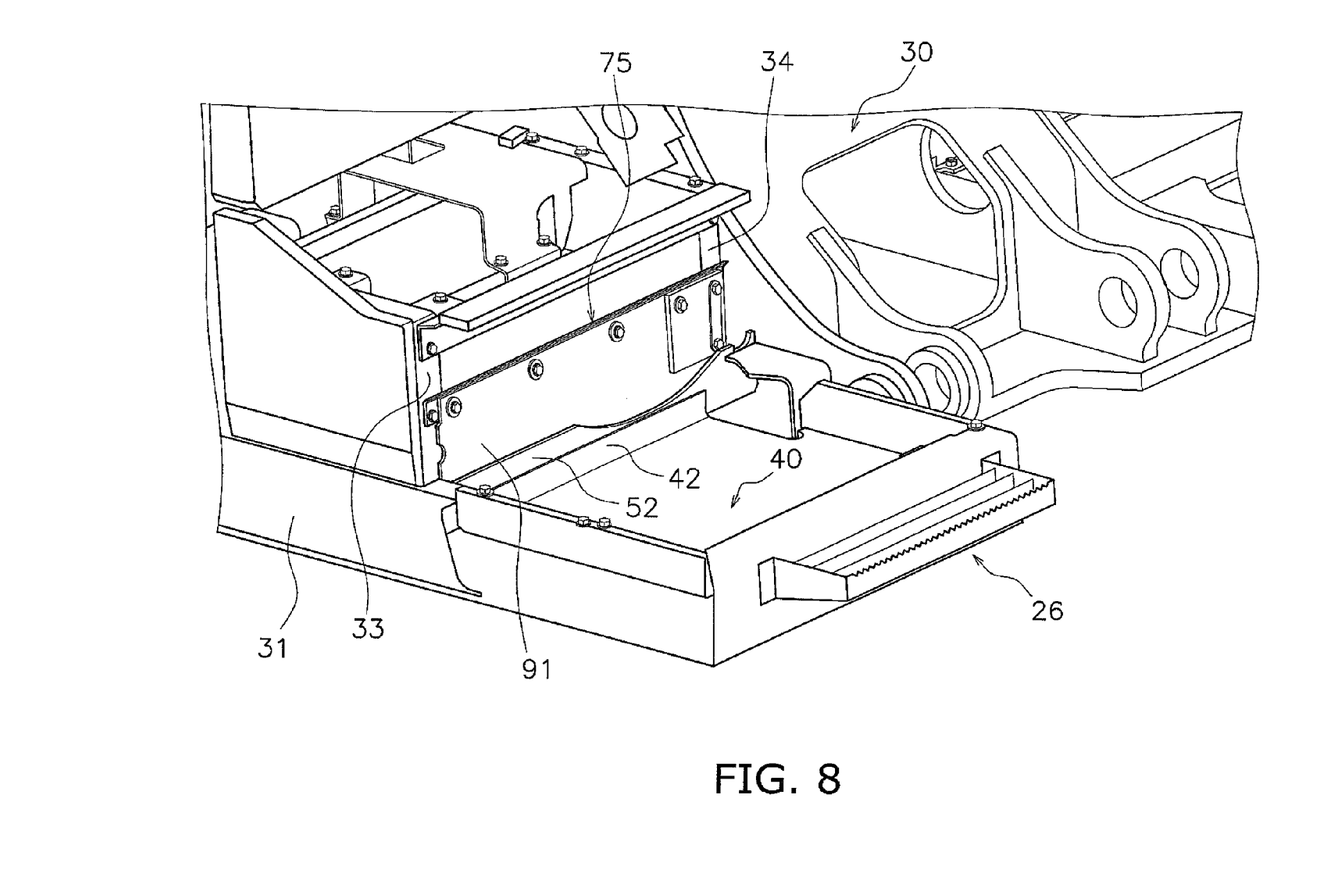
FIG. 8 is a perspective view of a detail close to a reducing agent tank.

A tank cover 80 is attached to cover the reducing agent tank 18. As illustrated in FIG. 8, a plurality of pillar parts are fixed to the revolving frame 26. Specifically, a first pillar part 33 extends upward from the first side frame 31. Moreover, a second pillar part 34 extending in the vertical direction is fixed to the center frame 30. The second pillar part 34 extends substantially parallel to the first pillar part 33. The tank cover 80 is supported by the plurality of pillar parts including the first pillar part 33 and the second pillar part 34.

As illustrated in FIG. 6, the tank cover 80 has an upper plate 81, a front plate 82, a right plate 83 (see FIG. 1), a left plate 84, and an opening and closing part 85. The upper plate 81 is positioned above the reducing agent tank 18. The front plate 82 is a plate-like member that extends in the vertical direction and the vehicle width direction, and is positioned approximately directly above the first side plate 61 of the battery cover 60. Moreover, a gap is formed between the front plate 82 and the first side plate 61. The right plate 83 is positioned to the right of the reducing agent tank 18, and the left plate 84 is positioned to the left of the reducing agent tank 18. An opening part straddling the upper plate 81 and the front plate 82 is formed and the opening part is covered by the opening and closing part 85. The opening and closing part 85 is attached to the upper plate 81 in a manner that allows opening and closing. Specifically, the opening and closing part 85 is attached to the upper plate 81 via hinges and the replenishing part 182 is exposed by opening the opening and closing part 85.

As illustrated in FIGS. 6 to 8, the second guide member 75 is disposed below the first guide member 71 and slopes downward toward the reducing agent tank 18. The second guide member 75 extends across the first pillar part 33 and the second pillar part 34. Specifically, the second guide member 75 is formed by bending one plate-like member (i.e., a steel plate), and has an attachment part 76 and a sloping part 77. The attachment part 76 is a portion attached to the first pillar part 33 and the second pillar part 34. The sloping part 77 is a portion that slopes upward from the upper edge of the attachment part 76 toward the front. That is, the sloping part 77 slopes downward toward the reducing agent tank 18.

Figure 9:
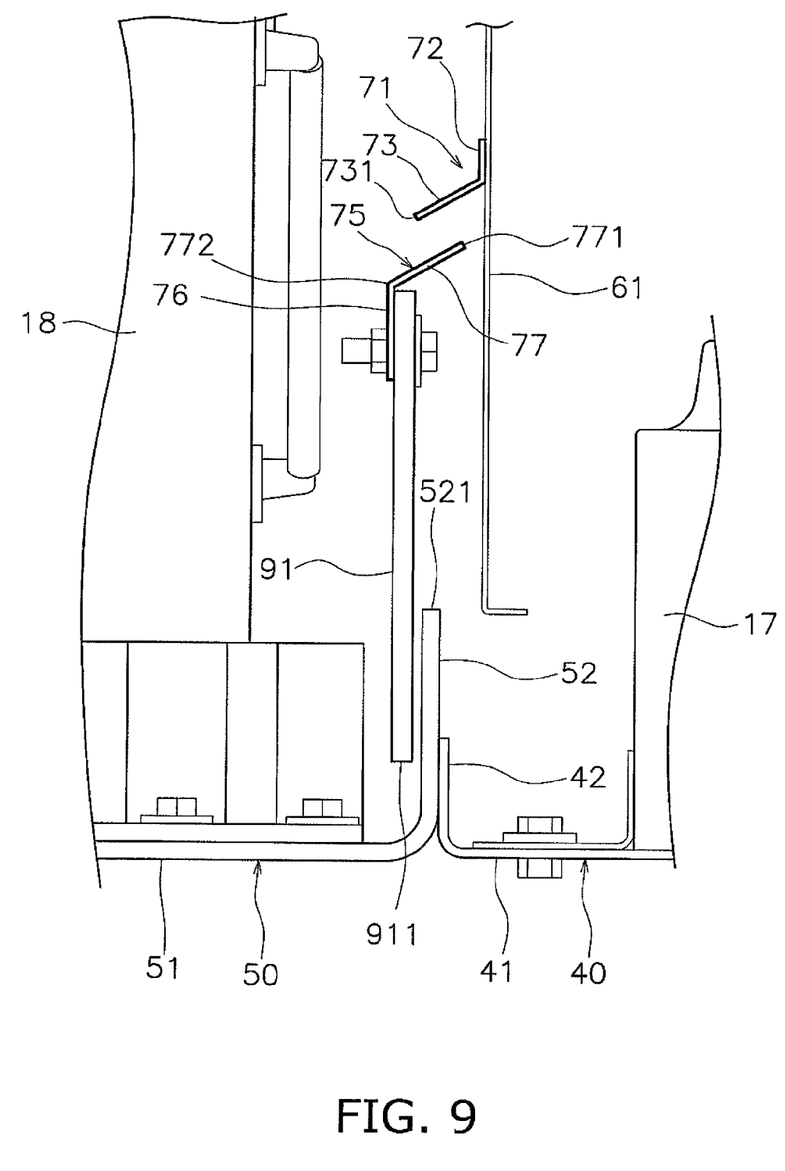
FIG. 9 is a side cross-sectional view of a detail close to a first and a second guide member.

FIG. 9 is a side cross-sectional view of a detail around the first guide member 71 and the second guide member 75. As illustrated in FIG. 9, the sloping part 77 of the second guide member 75 has a first end 771 and a second end 772 as seen from the side. The first end 771 of the second guide member 75 is positioned closer to the battery 17 than the distal end 731 of the first guide member 71. As a result, a portion of the sloping part 73 of the first guide member 71 overlaps a portion of the sloping part 77 of the second guide member 75 as seen in a plan view.

The second end 772 of the sloping part 77 in the second guide member 75 is positioned closer to the reducing agent tank 18 than the partition plate 52 of the reducing agent tank mounting member 50. That is, the second end 772 is positioned between the partition plate 52 and the reducing agent tank 18 in the front-back direction. As a result, the second end 772 is positioned above the bottom plate 51 of the reducing agent tank mounting member 50.

A partitioning member 91 is provided so as to extend between the second guide member 75 and the partition plate 52. Specifically, the partitioning member 91 hangs downward from the second end 772 side of the second guide member 75. The partitioning member 91 is made of rubber and has a rectangular shape and the length thereof in the vehicle width direction is substantially the same as that of the second guide member 75. An upper end part of the partitioning member 91 is fixed to the attachment part 76 of the second guide member 75. The partitioning member 91 is fixed to the surface of the attachment part 76 closer to the battery 17.

A lower end 911 of the partitioning member 91 is positioned closer to the bottom than an upper end 521 of the partition plate 52 of the reducing agent tank mounting member 50. That is, the lower end part of the partitioning member 91 and an upper end part of the partition plate 52 of the reducing agent tank mounting member 50 overlap each other in the vertical direction. The lower end 911 of the partitioning member 91 is positioned closer to the reducing agent tank 18 than the partition plate 52.

When replenishing the reducing agent tank 18 with the reducing agent in the hydraulic excavator 100 configured as described above, first a replenishing container containing reducing agent for replenishing is placed on the upper plate 65 (FIG. 6) of the battery cover 60. The operator stands on the upper plate 65 of the battery cover 60 to perform the replenishing of the reducing agent. Next, the operator opens the opening and closing part 85 of the tank cover 80 to expose the replenishing part 182 of the reducing agent tank 18. The operator removes the lid part 183 and pours the reducing agent into the reducing agent tank 18 from the replenishing container.

(Characteristics)

The hydraulic excavator 100 according to the present embodiment has the following features.

(1) When the reducing agent is spilled on top of the upper plate 65 on the battery cover 60 during an operation for replenishing the reducing agent as described above, the reducing agent tends to spill on a portion of the upper plate 65 close to the reducing agent tank 18, that is, on the rear part of the upper plate 65. As a result, when the reducing agent is spilled on the upper plate 65 of the battery cover 60, the spilled reducing agent flows from the upper plate 65 downward along the first side plate 61 as indicated by the chain double-dashed line arrow in FIG. 6. The reducing agent flowing downward along the first side plate 61 then flows along the first guide member 71 and drips down from the distal end 731 of the first guide member 71 toward the second guide member 75. The reducing agent that flows further downward along the second guide member 75 then drips downward from the second end 772 of the second guide member 75. The reducing agent that drips down from the second end 772 of the second guide member 75 drips down to the reducing agent tank mounting member 50 and does not flow toward the battery 17. As a result, adherence of the reducing agent on the battery 17 can be prevented.

(2) The partitioning member 91 is installed so as to extend between the second guide member 75 and the partition plate 52 whereby the reducing agent that drips down onto the reducing agent tank mounting member 50 is prevented from splashing toward the battery 17.

(3) Since the partitioning member 91 is made of rubber, distortion of the partitioning member 91 does not occur and the weight of the partitioning member 91 can be reduced.

MODIFIED EXAMPLES

While an embodiment of the present invention has been described above, the present invention is not limited to the embodiment and the following modifications may be made within the scope of the present invention.

Modified Example 1

While the distal end 731 of the first guide member 71 is described as being positioned closer to the reducing agent tank 18 than the partition plate 52 in the above embodiment, the positioning of the distal end 731 is not limited in this way. That is, the distal end 731 of the first guide member 71 may be positioned closer to the battery 17 than the partition plate 52.

Modified Example 2

Figure 10:
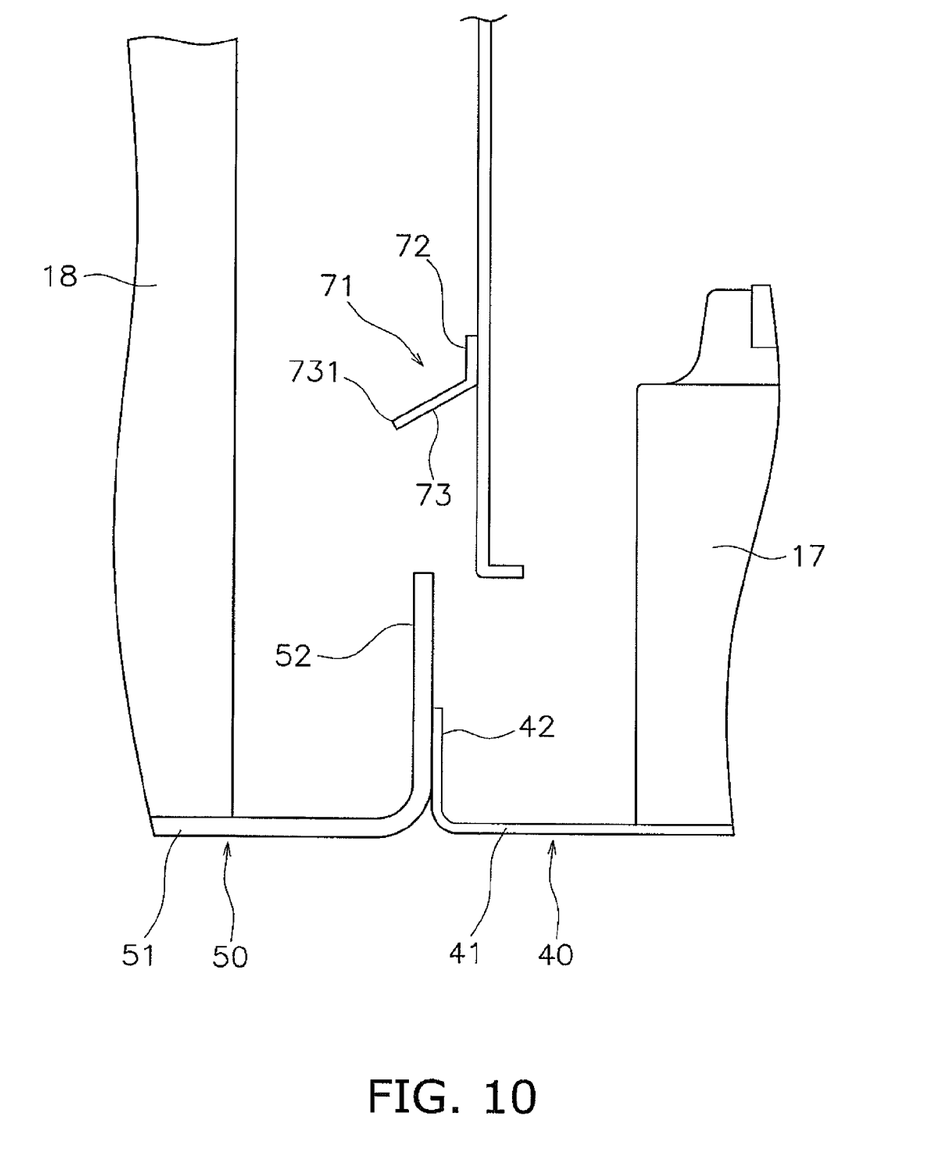
FIG. 10 is a side cross-sectional view of a right front part of a vehicle body according to a second modified example.

While the first guide member 71 and the second guide member 75 are installed and the reducing agent is guided toward the reducing agent tank mounting member 50 by the two guide members in the above embodiment, the second guide member 75 may be omitted. For example, a hydraulic excavator according to a second modified example is not provided with the second guide member and the partitioning member as illustrated in FIG. 10. The distal end 731 of the first guide member 71 is positioned closer to the reducing agent tank 18 than the partition plate 52. The first guide member 71 is preferably positioned lower than the installed position in the above embodiment so that the reducing agent that drips down from the distal end of the first guide member 71 drips down onto the reducing agent tank mounting member 50 more reliably.

Modified Example 3

While an example of a hydraulic excavator applicable to the present invention has been described in the above embodiment, the work vehicle applicable to the present invention is not limited to a hydraulic excavator. For example, a bulldozer, a wheel loader, or a motor grader and the like may be applied to the present invention.

What is claimed is:

1. A work vehicle comprising:
    a reducing agent tank;
    a battery disposed in a row with the reducing agent tank with a gap therebetween;
    a reducing agent tank mounting member having a bottom plate with the reducing agent tank mounted thereon, and a partition plate extending upward from the bottom plate and positioned between the reducing agent tank and the battery;
    a battery cover having an upper plate positioned above the battery, and a side plate extending downward from a side of the upper plate and positioned between the reducing agent tank and the battery;
    a first guide member extending from the side plate toward the reducing agent tank, the first guide member sloping downward; and
    a second guide member that is disposed below the first guide member, the second guide member sloping downward toward the reducing agent tank,
    the second guide member having a first end positioned closer to the battery than a distal end of the first guide member.

2. The work vehicle according to claim 1, wherein
    the second guide member further has a second end positioned closer to the reducing agent tank than the partition plate.

3. The work vehicle according to claim 1, further comprising:
    a partitioning member extending between the second guide member and the partition plate.

4. The work vehicle according to claim 3, wherein
    the partitioning member hangs down from the second guide member, and
    a lower end of the partitioning member is positioned closer to the reducing agent tank than the partition plate and is positioned lower than an upper end of the partition plate.

5. The work vehicle according to claim 3, wherein
    the partitioning member is made of rubber.

6. The work vehicle according to claim 2, further comprising:
    a partitioning member extending between the second guide member and the partition plate.

7. The work vehicle according to claim 6, wherein
the partitioning member hangs down from the second guide member, and
a lower end of the partitioning member is positioned closer to the reducing agent tank than the partition plate and is positioned lower than an upper end of the partition plate.
8. The work vehicle according to claim 7, wherein
the partitioning member is made of rubber.
9. The work vehicle according to claim 6, wherein
the partitioning member is made of rubber.
10. The work vehicle according to claim 4, wherein
the partitioning member is made of rubber.
11. A work vehicle comprising:
a reducing agent tank;
a battery disposed in a row with the reducing agent tank with a gap therebetween;
a reducing agent tank mounting member having a bottom plate with the reducing agent tank mounted thereon, and a partition plate extending upward from the bottom plate and positioned between the reducing agent tank and the battery;
a battery cover having an upper plate positioned above the battery, and a side plate extending downward from a side of the upper plate and positioned between the reducing agent tank and the battery; and
a first guide member extending from the side plate toward the reducing agent tank, the first guide member sloping downward,
a distal end of the first guide member being positioned closer to the reducing agent tank than the partition plate.

* * * * *